(12) United States Patent
Xu et al.

(10) Patent No.: US 8,949,208 B1
(45) Date of Patent: *Feb. 3, 2015

(54) SYSTEM AND METHOD FOR BULK DATA MOVEMENT BETWEEN STORAGE TIERS

(75) Inventors: Teng Xu, Santa Clara, CA (US); Windsor W. Hsu, San Jose, CA (US); Lan Chin, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/250,670

(22) Filed: Sep. 30, 2011

(51) Int. Cl.
*G06F 7/00* (2006.01)
*G06F 17/00* (2006.01)
*G06F 17/30* (2006.01)

(52) U.S. Cl.
USPC ............................ 707/698; 707/661; 707/673

(58) Field of Classification Search
CPC .......... G06F 17/30289; G06F 17/3056; G06F 17/30902; G06F 17/30235; G06F 17/30876; G06F 17/30914
USPC .................... 707/626, 704, 712, 769; 706/47; 713/190; 709/220; 711/117; 705/35
See application file for complete search history.

(56) References Cited

U.S. PATENT DOCUMENTS

| | | | |
|---|---|---|---|
| 5,822,780 A | 10/1998 | Schutzman | |
| 6,567,091 B2 * | 5/2003 | Dye et al. ....................... | 345/501 |
| 6,578,131 B1 | 6/2003 | Larson et al. | |
| 7,152,220 B2 * | 12/2006 | Rickards et al. .............. | 717/101 |
| 7,873,619 B1 | 1/2011 | Faibish et al. | |
| 7,949,650 B2 * | 5/2011 | Indeck et al. ................. | 707/712 |
| 8,069,102 B2 * | 11/2011 | Indeck et al. .................. | 705/35 |
| 8,095,577 B1 | 1/2012 | Faibish et al. | |
| 8,271,751 B2 * | 9/2012 | Hinrichs, Jr. .................. | 711/161 |
| 2004/0015600 A1 | 1/2004 | Tiwary et al. | |
| 2005/0004954 A1 * | 1/2005 | Soule, III ...................... | 707/203 |
| 2009/0171885 A1 * | 7/2009 | Silberstein et al. .............. | 707/2 |
| 2010/0274772 A1 * | 10/2010 | Samuels ........................ | 707/693 |
| 2011/0167221 A1 * | 7/2011 | Pangal et al. ................. | 711/117 |
| 2011/0202732 A1 * | 8/2011 | Montgomery ................ | 711/154 |
| 2011/0242979 A1 * | 10/2011 | Feroz et al. ................... | 370/235 |
| 2012/0117349 A1 * | 5/2012 | Lau et al. ....................... | 711/165 |
| 2012/0310974 A1 * | 12/2012 | Zhu et al. ...................... | 707/769 |

OTHER PUBLICATIONS

Non-Final Office Action, U.S. Appl. No. 13/250,684, dated Aug. 27, 2012, 12 pages.
Final Office Action, U.S. Appl. No. 13/250,684, dated Feb. 6, 2013, 14 pages.
Non-Final Office Action, U.S. Appl. No. 13/250,684, dated Apr. 15, 2014, 19 pages.

* cited by examiner

*Primary Examiner* — Susan Chen
(74) *Attorney, Agent, or Firm* — Blakely, Sokoloff, Taylor & Zafman LLP

(57) ABSTRACT

Techniques for data migration of a storage system are described herein. According to one embodiment, a candidate index is generated to store information identifying a plurality of segments associated with one or more candidate files of a source storage tier to be migrated to a target storage tier of a storage system. Segments of the one or more candidate files are then migrated from the source storage tier to the target storage tier according to a sequential order, and based on the candidate index.

21 Claims, 12 Drawing Sheets

SYSTEM AND METHOD FOR BULK DATA MOVEMENT BETWEEN STORAGE TIERS

RELATED APPLICATIONS

This application is related to co-pending U.S. patent application Ser. No. 13/250,678, entitled "System and Method for Estimating Storage Space Needed to Store Data migrated from a Source Storage to a Target Storage," filed Sep. 30, 2011, and co-pending U.S. patent application Ser. No. 13/250,684, entitled "System and Method for Data Migration using Hybrid Modes," filed Sep. 30, 2011. The disclosure of the above applications is incorporated by reference herein in its entirety.

FIELD OF THE INVENTION

Embodiments of the present invention relate generally to data storage systems. More particularly, embodiments of the invention relate to data migration of data storage systems.

BACKGROUND

A typical data system may have multiple tiers of storage. Higher tier storage may include high performance disks and flash-based storage devices that provide faster access times and other benefits. Lower tier storage may include generic disks that are able to store data cheaply. Tiering storage generally enhances the efficiency of data systems. For example, not all files are accessed frequently. Files that are accessed frequently may be stored on higher tier storage to allow for quick access. Files that are accessed infrequently may be stored on lower tier storage for economic reasons. Deduplication may further enhance the efficiency of data systems. Deduplication generally involves storing only a single instance of data, or a segment of data. Since many files may share common data segments, performing deduplication on one or more tiers of storage may potentially result in substantial storage savings.

Files typically do not stay in the same tier for prolonged periods of time. Some files may lose importance, causing them to be moved (e.g., migrated) to a lower tier storage. Similarly, some files may gain importance, causing them to be moved to higher tier storage. Unfortunately, moving files, or data, between different tiers may take a long time and computing resources if it involves moving the whole file or data. In a deduplication storage system, files are stored in a form of deduplicated segments. A deduplicated segment may be referenced by multiple files. Typically, when a file is moved from a storage tier to another storage tier, segments of the file are identified via a file system of a source tier and moved to a target tier. When the same segments are referenced by multiple files that are to be moved, for each of the files referencing the segments, the process of identifying the segments and/or determining the deduplication of the segments may be repeatedly performed. Such a process tends to be slow and inefficient due to the degradation in locality over time caused by space reclamation processes.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
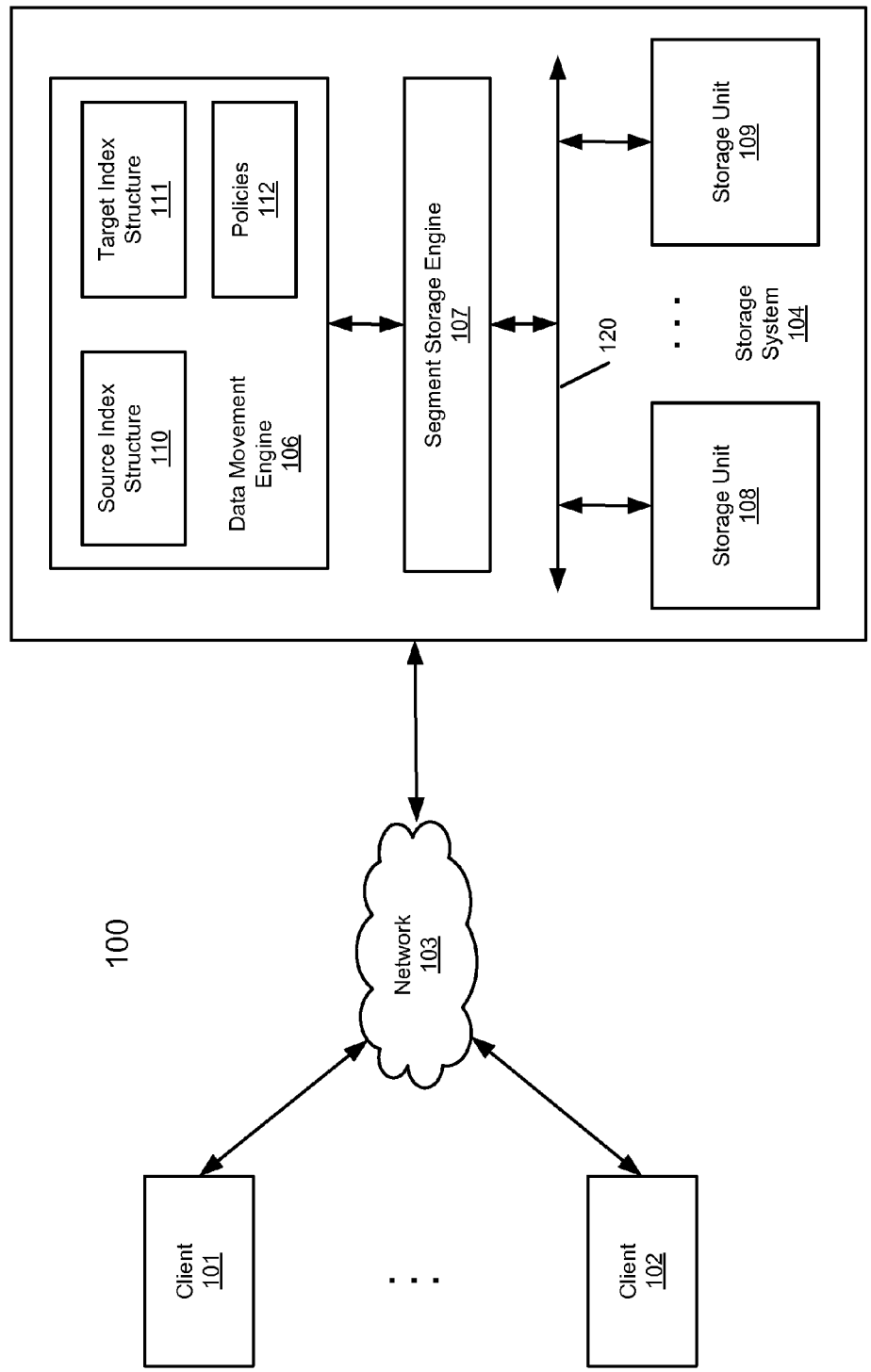
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, data migration from a source storage (also referred to as a source storage tier or a source tier) to a target storage (also referred to as a target storage tier or a target tier) includes at least two phases: 1) segment identification phase and 2) data movement phase. During the segment identification phase, candidate files that are suitable for migration are identified based on a data migration policy. In one embodiment, candidate files may be identified as those that have not been accessed for a predetermined period of time. For each candidate file, segments (e.g., deduplicated segments) of the candidate file are identified. A candidate index is generated and populated based on the segments of the candidate files, where the candidate index is used to identify all of the deduplicated segments of all the candidate files. The candidate index can be implemented in a variety of data structures including, but are not limited to, a bloom filter. Once all of the segments of candidate files have been identified and indicated in the candidate index, the segment identification phase ends and the data movement phase starts.

During the data movement phase, according to one embodiment, segments of the candidate files are identified based on the candidate index and storage containers that contain the identified segments are scanned to retrieve the identified segments from the storage. The segments are then transmitted to the target tier in a bulk manner. Thus, since all the candidate segments have been identified in the candidate index, processing logic only needs to scan the storage containers (e.g., at a physical storage level) once based on the candidate index to locate and retrieve the identified segments, without having to scan the data in namespace order as used by a regular data movement method, which may incur some unnecessary random disk accesses. This data movement method is referred to as a bulk data movement method.

According to one embodiment, prior to populating the candidate index to indicate segments of a candidate file to be migrated, processing logic associated with the source tier communicates with processing logic associated with the target tier to estimate a storage space that is needed to store segments of the candidate file in the target tier. The candidate index is populated only if the target tier has enough storage capacity to store the segments (e.g., deduplicated segments) of the candidate file. The segment candidates indicated in the candidate index are subsequently migrated to the target tier in a bulk manner.

Data movement can be performed using a regular data movement method, a bulk data movement method, or a combination thereof. In one embodiment, a data movement method can be determined based on specific configuration or characteristics, such as, for example, user requirement and data requirement, of the source tier at the point in time of the data migration. A bulk data movement method may be selected if there are many candidate files for migration and/or the candidate files are large and/or the candidate files have a lower data compression rate and/or the candidate files have poor locality so that reading the segments of the files in file order will incur many random I/Os. A regular data movement method may be selected if there are few candidate files for migration and/or the candidate files are small and/or the candidate files have a higher data compression rate and/or the candidate files have good locality so that the segments of the files are stored close together and largely sequentially. A regular data movement method refers to a process in which a candidate file is identified in a source tier and migrated to a target tier on a file-by-file basis.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplication storage system available from EMC® Corporation of Hopkinton, Mass.

In one embodiment, storage system 104 includes, but is not limited to, data movement engine 106, segment storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, segment storage engine 107 is configured to segment the data file into multiple segments according to a variety of segmentation policies or rules. Segment storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, storage units 108-109 may be configured as different storage tiers for storing different categories of data, which may be implemented within the same storage system and controlled by the same data movement engine and segment storage engine. Alternatively, they may be implemented in different storage systems (e.g., systems similar to storage system 104) and controlled by different data movement engines and segment storage engines associated therein. Files can be moved amongst storage units 108-109 or amongst different storage systems. A storage unit or storage system is referred to as a source tier from which files are migrated. A storage unit or storage system is referred to as a target tier to which files are migrated from a source tier. A storage unit or storage system can be either a source tier with respect to a first remote storage system or a target tier with respect to a second remote storage system, as files can be migrated in both ways.

According to one embodiment, data movement engine 106 includes, but is not limited to, source candidate index 110 (also referred to as a source index structure or simply index structure), target index 111 (also referred to as a target index structure or simply index structure), and one or more migration policies 112. Candidate files that are suitable for migration are identified based on migration policies 112. In one embodiment, candidate files may be identified as those that have not been accessed and/or modified for a predetermined period of time. For each candidate file, segments (e.g., deduplicated segments) of the candidate file are identified and source candidate index 110 is populated based on the segments of the candidate files, where the source candidate index 110 is used to identify all of the deduplicated segments of all the candidate files to be migrated. Source candidate index 110 can be implemented in a variety of data structures including, but are not limited to, a bloom filter. Once all of the segments of candidate files have been identified and populated in source candidate index 110, storage containers that contain the segments identified in source candidate index 110 are scanned and retrieved from the storage. The segments are then transmitted to the target tier in a bulk manner.

Thus, the entire data migration process includes at least two phases: 1) segment identification phase and 2) data movement phase. During the first phase (e.g., segment identification phase), all of the deduplicated segments of all candidate files are identified and populated in source candidate index 110. Then during the second phase (e.g., data movement phase), all of the deduplicated segments identified by source candidate index 110 are retrieved from the storage and transmitted to the target tier in a bulk manner (e.g., within the same or contiguous data movement sessions). Since all the candidate segments have been identified in source candidate index 110, data movement engine 106 will only need to scan the storage containers (e.g., at a physical storage level) once based on source candidate index 110 to locate and retrieve the identified segments, without having to scan the data in namespace order as used by a regular data movement method, which may incur some unnecessary random disk accesses.

According to one embodiment, prior to populating source candidate index 110 to indicate segments of a candidate file to be migrated, data movement engine 106 communicates with the corresponding data movement engine associated with the target tier to estimate a storage space that is needed to store segments of the candidate file in the target tier. Source candidate index 110 is populated only if the target tier has enough storage capacity to store the segments (e.g., deduplicated segments) of the candidate file. The segment candidates indicated in source candidate index 110 are subsequently migrated to the target tier in a bulk manner.

In one embodiment, a target tier maintains and utilizes a target index to store information indicating the deduplicated segments currently stored in the target tier. For example, for the purpose of illustration, it is assumed that storage system 104 operates as a target tier storage system, data movement engine 106 is configured to generate and maintain target index 111 to store information indicating all the segments (e.g., deduplicated segments) that are currently stored in one of storage units 108-109 of storage system 104. Target index 111 may be implemented in a variety of data structures such as a bloom filter. Target index 111 may be generated and maintained throughout the operations of storage system 104 when segments are being stored in storage system 104 or alternatively, it can be generated and updated periodically by scanning segments stored in the storage containers.

In one embodiment, prior to migrating a segment, representative data (e.g., fingerprint) of the segment is received from a remote source tier. Based on the representative data, target index 111 is examined to determine whether the segment has been stored in storage system 104. Based on target index 111, according to one embodiment, the target tier notifies the remote source tier whether a particular segment has been stored in the target tier. Based on the notification, the remote source tier can estimate a storage space of storage system 104 required. Typically, only those segments that have not been stored in a target tier need to be migrated, which require additional storage space at the target tier.

Data movement from a source tier to a target tier can be performed using a regular data movement method, a bulk data movement method, or a combination thereof. In one embodiment, data movement engine 106 further includes an analysis module (not shown) to monitor or analyze the storage configuration and characteristics, such as user requirement and/or data requirement, of storage units 108-109 to determine a data movement method. A bulk data movement method may be selected if there are many candidate files for migration and/or the candidate files are large and/or the candidate files have a lower data compression rate and/or the candidate files have poor locality so that reading the segments of the files in file order will incur many random I/Os. A regular data movement method may be selected if there are few candidate files for migration and/or the candidate files are small and/or the candidate files have a higher data compression rate and/or the candidate files have good locality so that the segments of the files are stored close together and largely sequentially. When a regular data movement method is utilized, data migration is performed based on a file-by-file basis, in which a candidate file is identified and migrated to a target tier before processing a next candidate file. Typically, a file system and its logical namespace are utilized in identifying and/or moving a candidate file and its segments.

Figure 2:
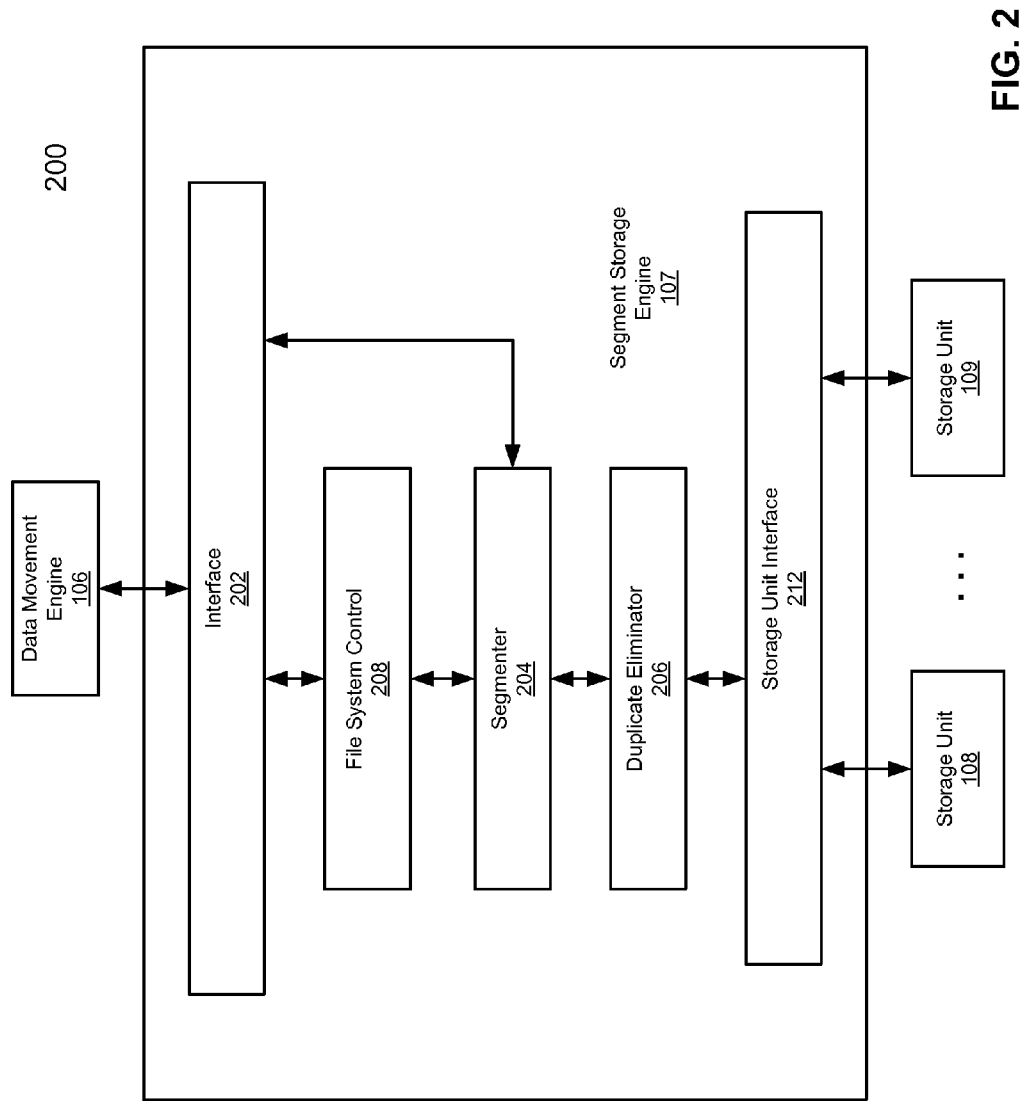
FIG. 2 is a block diagram illustrating a segment storage engine according to one embodiment of the invention.

FIG. 2 is a block diagram illustrating a segment storage engine according to one embodiment of the invention. Note that for purposes of illustration only, certain reference numbers for certain components having the same or similar functionalities from the previous figures or description may be retained the same. Referring to FIG. 2, in one embodiment, segment storage engine 107 includes interface 202, segmenter 204, duplicate eliminator 206, file system control 208, and storage unit interface 212. Segment storage engine 107 receives a file or files (or data item(s)) via interface 202 and a file system namespace (not shown). The file system namespace refers to the way files are identified and organized in the system. An example is to organize the files hierarchically into directories or folders. The file(s) is/are processed by segmenter 204 and file system control 208. Segmenter 204 breaks the file(s) into segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 208 processes information to indicate the segment(s) association with a file. In some embodiments, a list of fingerprints is used to indicate segment(s) associated with a file. File system control 208 passes segment association information (e.g., representative data such as a fingerprint) to an index (not shown). The index is used to locate stored segments in storage units 108-109 via storage unit interface 212. Duplicate eliminator 206 identifies whether a newly received segment has already been stored in storage units 108-109. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 108-109 that make up the file. Segments are then packed by a container manager (not shown) into one or more storage containers stored in storage units 108-109.

When a file is to be retrieved, interface 202 is configured to communicate with file system control 208 via a file system namespace to identify appropriate segments stored in storage units 108-109 via storage unit interface 212. File system control 208 communicates with an index (not shown) to locate appropriate segments stored in storage units via storage unit interface 212. Appropriate segments are retrieved from the associated containers via the container manager and are used to construct the requested file. The file is provided via interface 202 in response to the request. In one embodiment, file system control 208 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Data movement engine 106 is configured to access segment storage engine 107 via interface 202. According to one embodiment, data movement engine 106 is configured to communicate with file system control 208 via interface 202 to identify a list of candidate files suitable to be migrated to a target tier based on one or more migration policies. The migration policies may specify that certain files that have not been accessed and/or modified for a predetermined period of time are suitable for migration. Based on the identified candidate files, data movement engine 106 is configured to communicate with segmenter 204 to identify segments of the candidate files and to populate a source candidate index to indicate all of the deduplicated segments of the candidate files. Once all the deduplicated segments have been identified and indicated in the source candidate index, data movement engine 106 is configured to scan the containers via the container manager to locate and retrieve the segments, and to move the segments specified in the source candidate index to a target tier in a bulk manner.

In one embodiment, data movement engine 106 is configured to read the containers in order, and for each segment in a container, to look up the source candidate index to determine if the segment is to be moved to the target tier, and if so, to copy the segment to the target tier.

In one embodiment, prior to migrating a segment to a target tier, data movement engine 106 is configured to transmit representative data (e.g., fingerprint) of the segment to the target tier. Based on the representative data, the target tier can determine whether the corresponding segment has already been stored in the target tier, for example, by matching the representative data against a target index maintained by the target tier. Typically, only those segments that have not been stored in a target tier need to be migrated, which require additional storage space at the target tier. Based on a feedback received from the target tier, data movement engine 106 can estimate the additional storage space needed and make sure that the target tier has enough storage space before populating the source candidate index. Note that some or all of the components as shown in FIGS. 1-2 may be implemented in software, hardware, or a combination of both.

Figure 3:
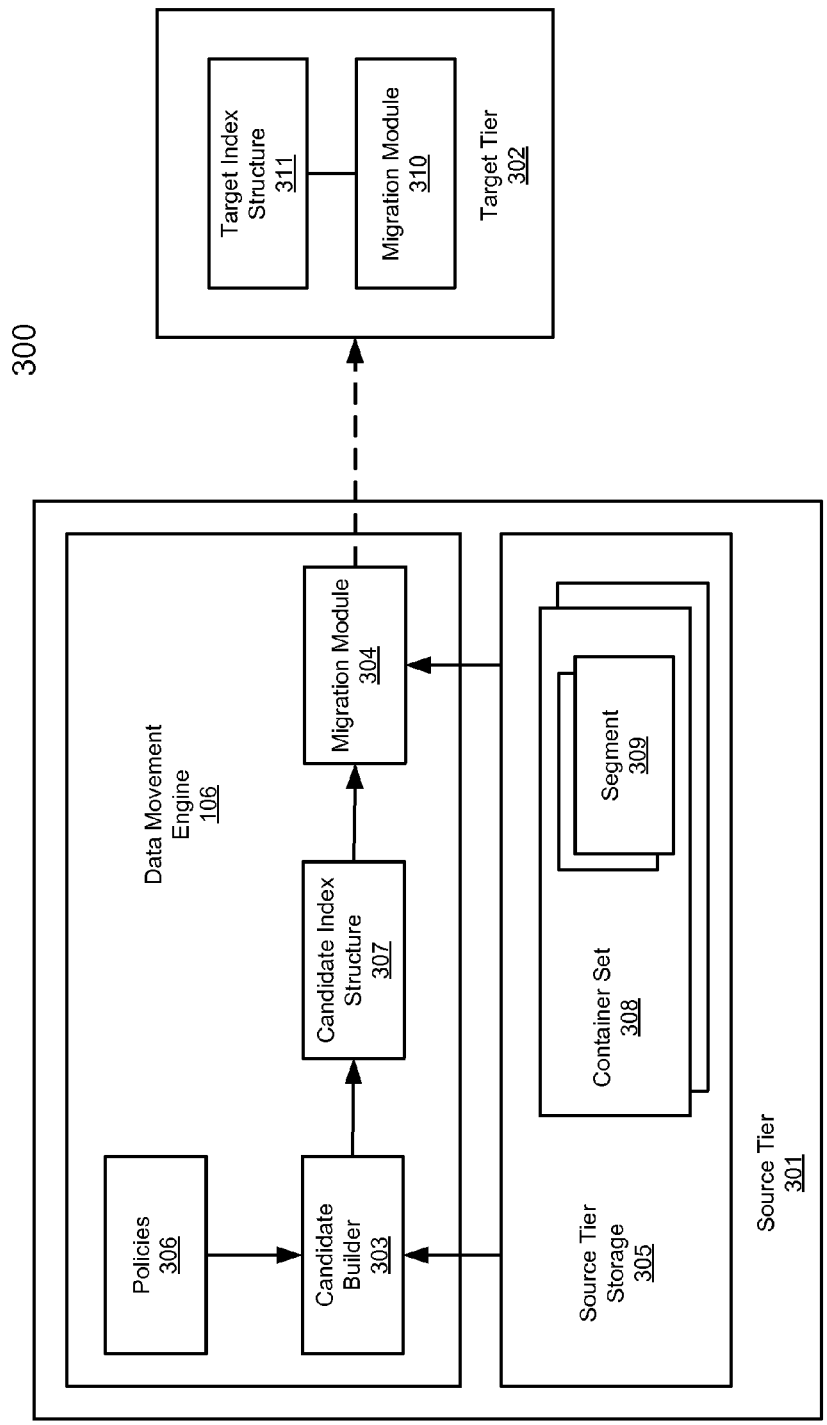
FIG. 3 is a block diagram illustrating architecture of a source tier according to one embodiment of the invention.

FIG. 3 is a block diagram illustrating architecture of a source tier according to one embodiment of the invention. System 300 may be implemented as part of system 100 of FIG. 1. Referring to FIG. 3, system 300 includes a source tier 301 communicatively coupled to target tier 302 for the purpose of migrating data from source tier 301 to target tier 302. Source tier 301 and target tier 302 may represent different storage servers over a network or alternatively, they may represent different storage units of the same storage server. The architectures of source tier 301 and target tier 302 may be identical or similar since either one of them can represent a source tier and/or a target tier dependent upon the circumstances. For example, the architecture of source tier 301 and/or target tier 302 may be implemented as part of or similar to system 200 of FIG. 2.

In one embodiment, source tier 301 includes candidate builder 303 and migration module 304, which may be implemented in software, hardware, or a combination of both. Candidate builder 303 is configured to identify a list of candidate files stored in storage 305 that are suitable for being migrated to target tier 302 based on one or more policies 306. In one embodiment, according to policies 306, files that have not been accessed and/or modified for a predetermined period of time can be considered as candidate files for migration. Candidate builder 303 can determine whether a file has been accessed and/or modified for a period of time by examining a file attribute of the file via a file system (e.g., file system control 208 of FIG. 2) of source tier 301. The file attribute of a file can be a time attribute associated with the file such as the last access or modified time attribute, which may be specified by policies 306. That is, policies 306 may specify which of the file attributes that candidate builder 303 should examine in order to determine whether a file should be considered as a candidate for migration. Policies 306 may further specify the types of files (e.g., file extensions) and/or the portion of namespace (e.g., files in a specified directory) to be considered for migration purposes.

For each of the candidate files identified based on policies 306, according to one embodiment, candidate builder 303 populates candidate index 307 to indicate that the candidate file should be processed subsequently for migration. Note that the processes of identifying candidate files and populating candidate index 307 may be considered as part of a segment identification phase of data migration. During the segment identification phase, all of the segments for migration are identified, but the actual data is not moved during this phase. Once all of the candidate segments have been identified, the actual data is moved from source tier 301 to target tier 302 during a data movement phase (e.g., in a bulk manner).

In one embodiment, during the segment identification phase, for each candidate file, segments (e.g., deduplicated segments) of the candidate file are identified, for example, via traversing a segment tree or similar data structure associated with the candidate file. For each of the segments of the candidate file, a field of candidate index 307 corresponding to the segment is marked by a predetermined value indicating that the segment should be migrated subsequently during the data movement phase. Note that candidate index 307 can be implemented in a variety of data structures, such as, for example, a bloom filter.

Figure 4:
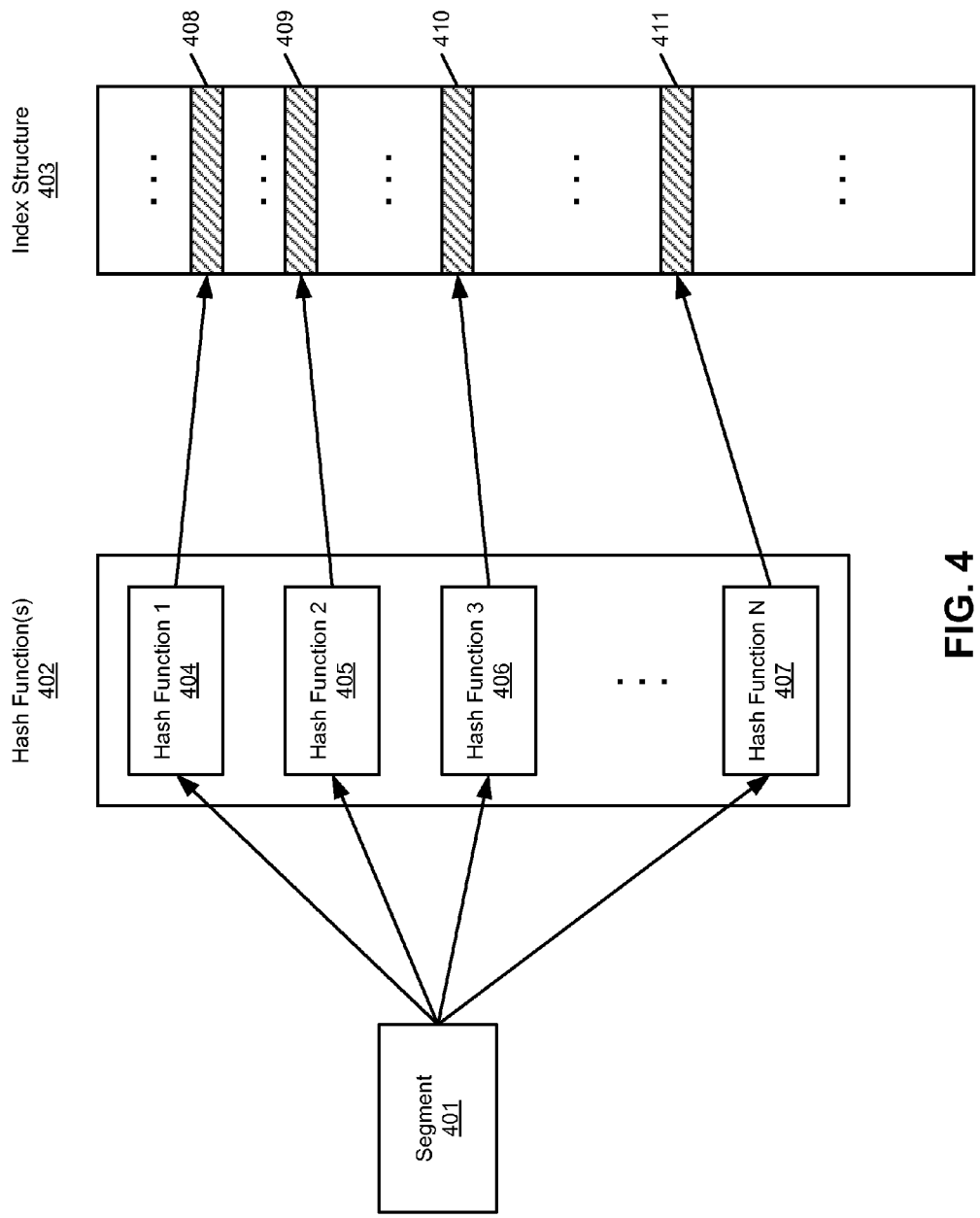
FIG. 4 is a block diagram illustrating a process for populating a source candidate index according to one embodiment of the invention.

According to one embodiment, for each segment candidate, a hash operation is performed on content of the segment using one or more predetermined hash functions. A hash function can be implemented using a variety of hash algorithms, such as, for example, SHA-1 or MD5 algorithms. Based on a result of the hash operation, one or more fields of candidate index 307 are populated, for example, by setting the fields to a predetermined value. For example, as shown in FIG. 4, segment candidate 401 is fed into hash function 402, which may include one or more of hash functions 404-407. The result of hash function 402 is used to populate one or more fields 408-411 of index 403, where index 403 may represent candidate index 307. That is, the result of the hash operation is used to identify a field within index 403 that should be populated with a predetermined value.

In one embodiment, target index 403 is implemented as a bit array, one or more bits corresponding to a segment to be migrated. A result of a hash operation is utilized as an index or offset to an entry of the bit array. Each bit may contain a logical value (e.g., true/false or one/zero) indicating whether the corresponding segment should be migrated. Note that hash operations of multiple segments could yield the same hash value or result (e.g., collisions) dependent upon the design of the hash function, which may produce false positive results. According to one embodiment, in order to reduce a false positive rate, multiple hash functions such as hash functions 404-407 are applied to the segment such as segment 401, which produces multiple hash values. Based on the hash values, multiple fields such as fields 408-411 are populated for the segment. That is, for a particular segment such as segment 401 to be migrated, all of the fields 408-411 should contain the predetermined value. In this way, the chance of multiple segments ended up with the same set of multiple fields in target index 403 can be greatly reduced.

Referring back to FIG. 3, target tier 302, which may have a similar architecture of source tier 301, includes migration module 310 and target index 311. Target index 311 is used to indicate all of the segments (e.g., deduplicated segments) currently stored in target tier 302. Target index 311 is maintained by target tier 302 similar to target index 403 of FIG. 4, for example, using the same or similar hash function(s) as used by source tier 301. In one embodiment, for each segment stored within target tier 302, a result of a hash operation is generated, for example, using certain techniques described above. Based on the result of a hash operation, a corresponding field of target index 311 is populated indicating that the segment has been stored in target tier 302.

In one embodiment, there are at least two operations carried out in candidate index building: a) an estimate of whether the file fits in the target tier; and b) if the file fits, population of the candidate index based on the segments of the file. During the first operation, processing logic identifies all the segments of the file and for each segment, processing logic looks up the candidate index first to determine whether the segment exists in the candidate index. If the segment exists in the candidate index, the segment is skipped (i.e. not accounted for in the size of data to be moved). If the segment does not exist in the candidate index, processing logic looks up the target index of the target tier to determine if the segment already exists in the target tier. After processing all the segments of the file or a random sample of the segments of the file, the determination of whether the file will fit into target tier 302 can be made by comparing the size of data to be moved with the available space of target tier 302. The size of data to be moved may be calculated by taking into account additional segments that are not counted due to the possible false positive rate of the candidate index and the target index of the target tier.

According to one embodiment, prior to populating a fingerprint in candidate index 307, candidate builder 303 is configured to send the fingerprint to target tier 302. In response the fingerprint, migration module 310 of target tier 302 is configured to examine a field of target index 311 corresponding to the fingerprint to determine whether the field has been populated with a predetermined value used to indicate a presence or absence of the segment. A proper response is then transmitted from target tier 302 to source tier 301. Based on the response, candidate builder 303 can then decide whether or not to include the segment in the size of data to be moved. After thus processing all the segments of the file or a random sample of the segments of the file, the determination of whether the file will fit into target tier 302 can be made by comparing the size of data to be moved with the available space of target tier 302.

Once all of the segments for migration have been identified and populated in candidate index 307, the data movement phase starts. During the data movement phase, migration module 304 is configured to scan container sets 308 of storage 305 based on candidate index 307 to locate and retrieve segment candidates 309, and to transmit segments 309 to target tier 302 in a bulk manner. In this way, migration module 309 only needs to scan container sets 308 once, for example, at a lower level such as a physical block level, without having to go through the logical namespace or file system which may include certain unnecessary random accesses and consume more time and processing power.

Figure 5:
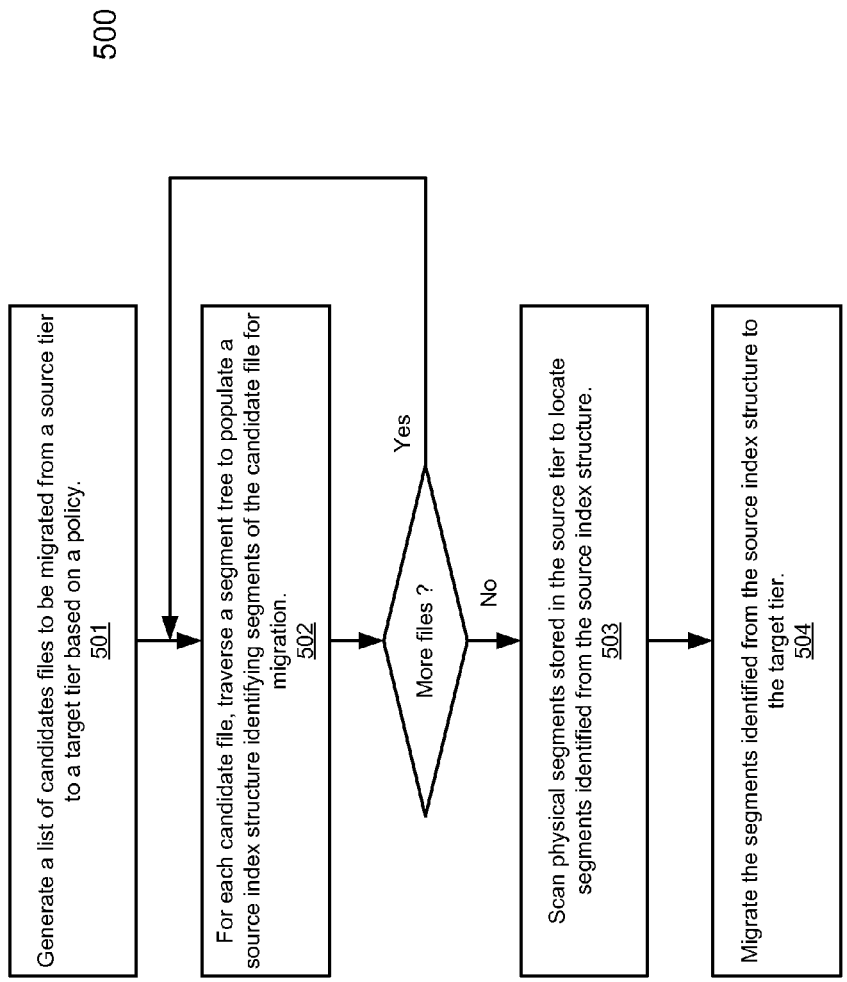
FIG. 5 is a flow diagram illustrating a method for data migration according to one embodiment of the invention.

FIG. 5 is a flow diagram illustrating a method for data migration according to one embodiment of the invention. Method 500 may be performed by data movement engine 106 of FIG. 1. Referring to FIG. 5, at block 501, a list of candidate files is generated for migration from a source tier to a target tier, where the candidate files are identified based on one or more migration policies. For example, files that have not been accessed and/or modified for a predetermined period of time may be considered as candidates for migration. Processing logic can scan all files stored in the source tier via the file system based on one or more file attributes such as a time attribute (e.g., last accessed or modified time attribute) of the files.

For each of the candidate files, at block 502, processing logic traverses a segment tree associated with the file to identify segments of the file and to populate a source candidate index. The source candidate index includes information identifying all the segments to be migrated from a source tier to a target tier. In one embodiment, for each segment, processing logic generates a fingerprint by hashing the segment using one or more hash functions or algorithms. Note that fingerprints of the segments may have been previously generated and stored in the source tier, such that the processing logic does not have to compute the same at the point in time. For example, when a segment was being stored in the source tier, a fingerprint of the segment was generated and separately stored in the source tier, for example, as part of metadata. The fingerprint is used to access a specific entry of the source candidate index that corresponds to the segment, where the entry is populated with a predetermined value. The source candidate index can be implemented using a variety of data structures, such as, for example, a bloom filter. The operations of block 502 may be iteratively performed for all of the candidate files.

Once of the candidate files have been identified and their respective candidate segments have been populated in the source candidate index, at block 503, processing logic scans the physical segments stored in the source tier based on the source candidate index to locate and retrieve all the candidate segments from the source tier. At block 504, the segments are then migrated from the source tier to the target tier in a bulk manner. According to one embodiment, each migrated file is verified to be properly written in the target tier, for example, by reading the file back, computing and comparing checksums, etc., before updating metadata of the source tier and/or target tier to reflect that the file indeed has been migrated to the target tier. In one embodiment, a file is verified to be properly written to the target tier by reading back only the segments that have been moved. The metadata is updated by examining if the file has been changed (e.g., deleted, updated) in the source tier since the file was written in the target tier. The metadata is updated only if the file has not been modified.

According to another embodiment, prior to data migration, the source tier and target tier communicate with each other to estimate the storage space that is required to store the data in the target tier. In one embodiment, for each candidate file, the candidate index is populated only if the target tier has enough storage capacity to store the segments (e.g., deduplicated segments) of the candidate file. The segment candidates indicated in the candidate index are subsequently migrated to the target tier in a bulk manner.

Figure 6:
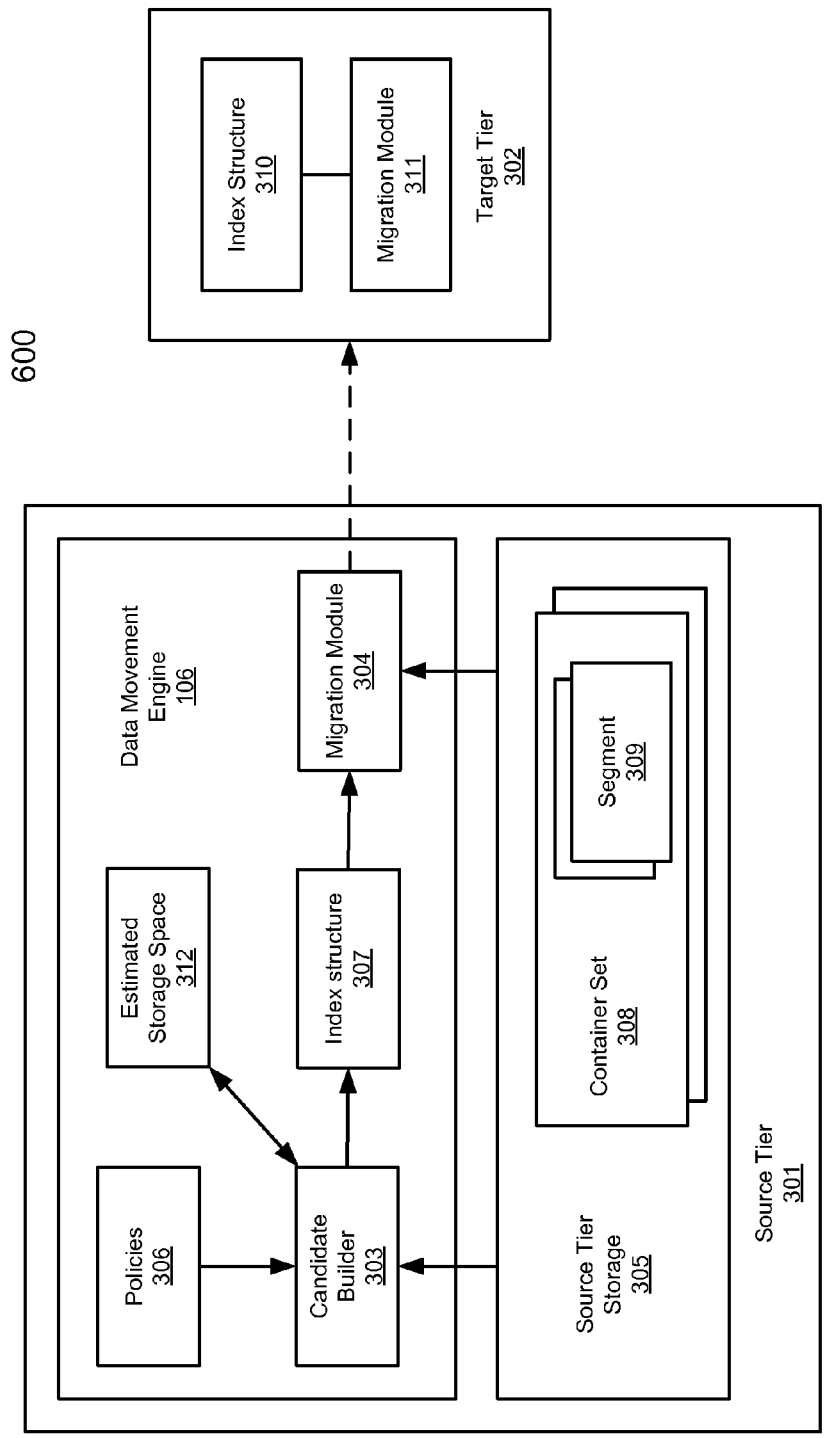
FIG. 6 is a block diagram illustrating architecture of a source tier according to another embodiment of the invention.

FIG. 6 is a block diagram illustrating architecture of a source tier according to another embodiment of the invention. Referring to FIG. 6, according to one embodiment, for each segment of each candidate file or a random sample of the segments of each candidate file, candidate builder 303 is configured to transmit a fingerprint of the segment to target tier 302. In response, migration module 310 of target tier 302 is configured to look up index 311 based on the fingerprint and to transmit a response back to source tier indicating whether the corresponding segment has been stored in target tier 302. In another embodiment, for each candidate file, candidate builder 303 of source tier 301 is configured to transmit fingerprints of all segments of the candidate file to target tier 302. In response, target tier 302 is configured to return the fingerprints corresponding to those segments that have not been stored in target tier 302.

Based on the response received from target tier 302, candidate builder 303 of source tier 301 can estimate, as part of estimated storage space 312, the storage space that is needed for storing the segments in target tier 302 based on the size of the segments. For example, according to a particular embodiment, candidate builder 303 may increment a counter (not shown) that represents a number of segments to be migrated for a particular candidate file, assuming the size of each segment is identical. Alternatively, the counter may be updated based on the specific size of each segment. Candidate builder 303 then communicates with target tier 302 to determine whether target tier 302 has enough storage space based on the estimated storage space. Alternatively, the response received from target tier 302 may further include information concerning whether target tier 302 has enough storage space for storing the segments corresponding to the fingerprints as described above. Once it is determined that target tier 302 has enough storage space for storing the to-be-migrated segments of a candidate file, the segments are then populated into source candidate index 307 based on their respective fingerprints.

In one embodiment, the storage space estimate is performed on a per-file basis instead of on a per-segment basis, since the migration is based on a file granularity. For example, if a file has N segments to be migrated (e.g., the segments that have not been stored in target tier 302), source tier 301 and target tier 302 will communicate with each other making sure that target tier 302 has enough storage space to store the N segments before candidate builder 303 of source tier 301 populates the N segments in source candidate index 307.

Figure 7:
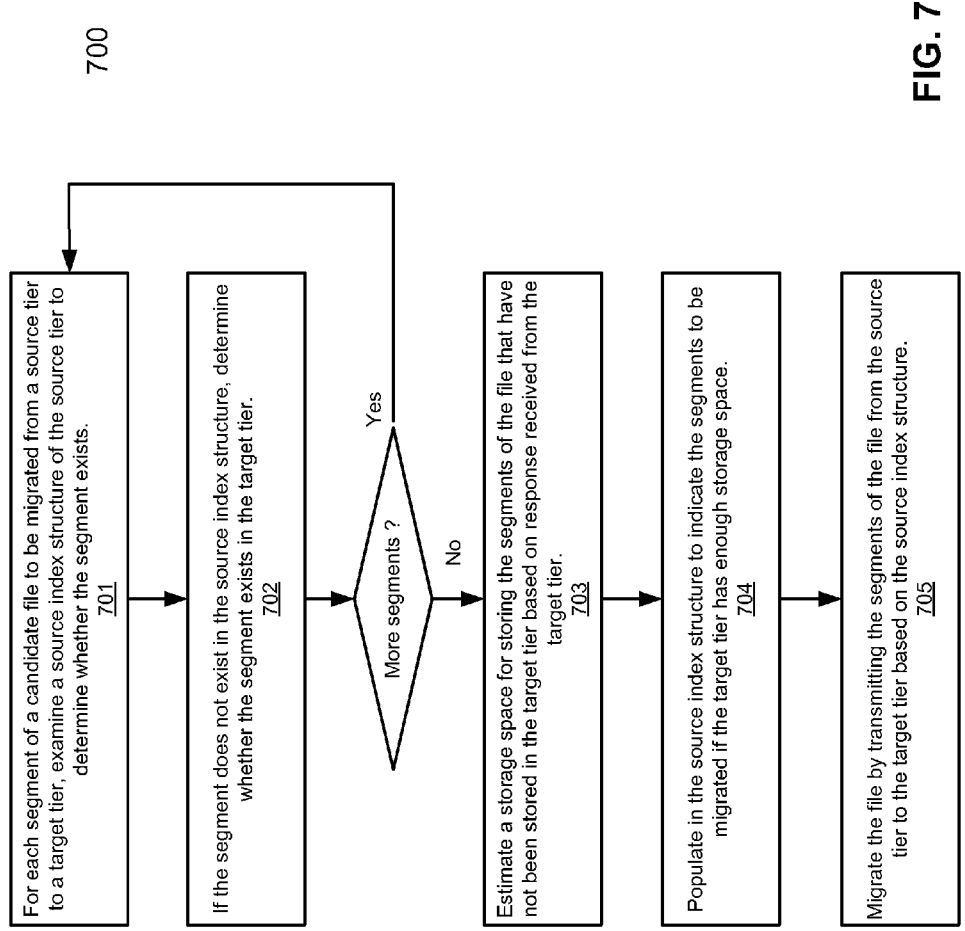
FIG. 7 is a flow diagram illustrating a method for data migration according to another embodiment of the invention.

FIG. 7 is a flow diagram illustrating a method for data migration according to another embodiment of the invention. Method 700 may be performed by data movement engine 106 of FIG. 1. Referring to FIG. 7, at block 701, for each segment of a candidate file to be migrated from a source tier to a target tier, processing logic obtains a fingerprint of the segment and looks up in a source candidate index to determine whether the corresponding segment has been populated in the source candidate index. In one embodiment, a hash function is applied to the fingerprint and the result of the hash function is utilized as an identifier such as an index or offset to locate an entry of the source candidate index corresponding to the segment. If it is determined that the segment has not been processed based on the source candidate index (e.g., the fingerprint has not been populated in the source candidate index), at block 702, processing logic communicates with the target tier to determine whether the segment is currently stored in the target tier. In one embodiment, for each segment, processing logic transmits the associated fingerprint to the target tier, where the target tier determines whether the fingerprint has been represented within a target index maintained by the target tier. The operations of blocks 701-702 may be iteratively performed for all of the segments for the candidate file.

Based on a response received from the target tier, at block 703, the processing logic estimates whether the target tier has enough storage space for storing the segments that have not been stored in the target tier. In one embodiment, for each of the segments of a candidate file that have not been stored in the target tier, processing logic calculates the required storage space optionally with additional storage space in view of possible false positive results associated with the source candidate index and the target index maintained by the target tier. Processing logic then communicates with the target tier to determine whether the target tier has enough storage space based on the estimated required storage space. If it is determined that the target tier has enough storage space, at block 704, processing logic populates the source candidate index to indicate the segments of the candidate file. The operations of blocks 701-704 may be iteratively performed for each of the candidate files. Once all segments of all candidate files have been populated in the source candidate index, at block 705, the container sets containing those segments indicated in the source candidate index are scanned to locate and retrieve the segments, and the retrieved segments are then migrated to the target tier.

According to some embodiments, data movement can be performed using a regular data movement method, a bulk data movement method, or a combination thereof. The technique described above is referred to as data migration with bulk data movement as opposed to regular data movement. During the bulk data movement configuration, all segments of all candidate files are identified and populated in a data structure. Then data of the identified segments are moved from a source tier to a target tier all together by scanning the container sets based on the physical locations of the segments identified from the data structure. The data may be moved within the same movement transaction or several continuous movement transactions. During the regular data movement configuration, each candidate file is identified and its segments are moved from the source tier to the target tier, one candidate file at a time. In the regular movement configuration, a candidate file is typically identified and its segments are retrieved via a logical namespace such as a file system of the storage system.

Figure 8:
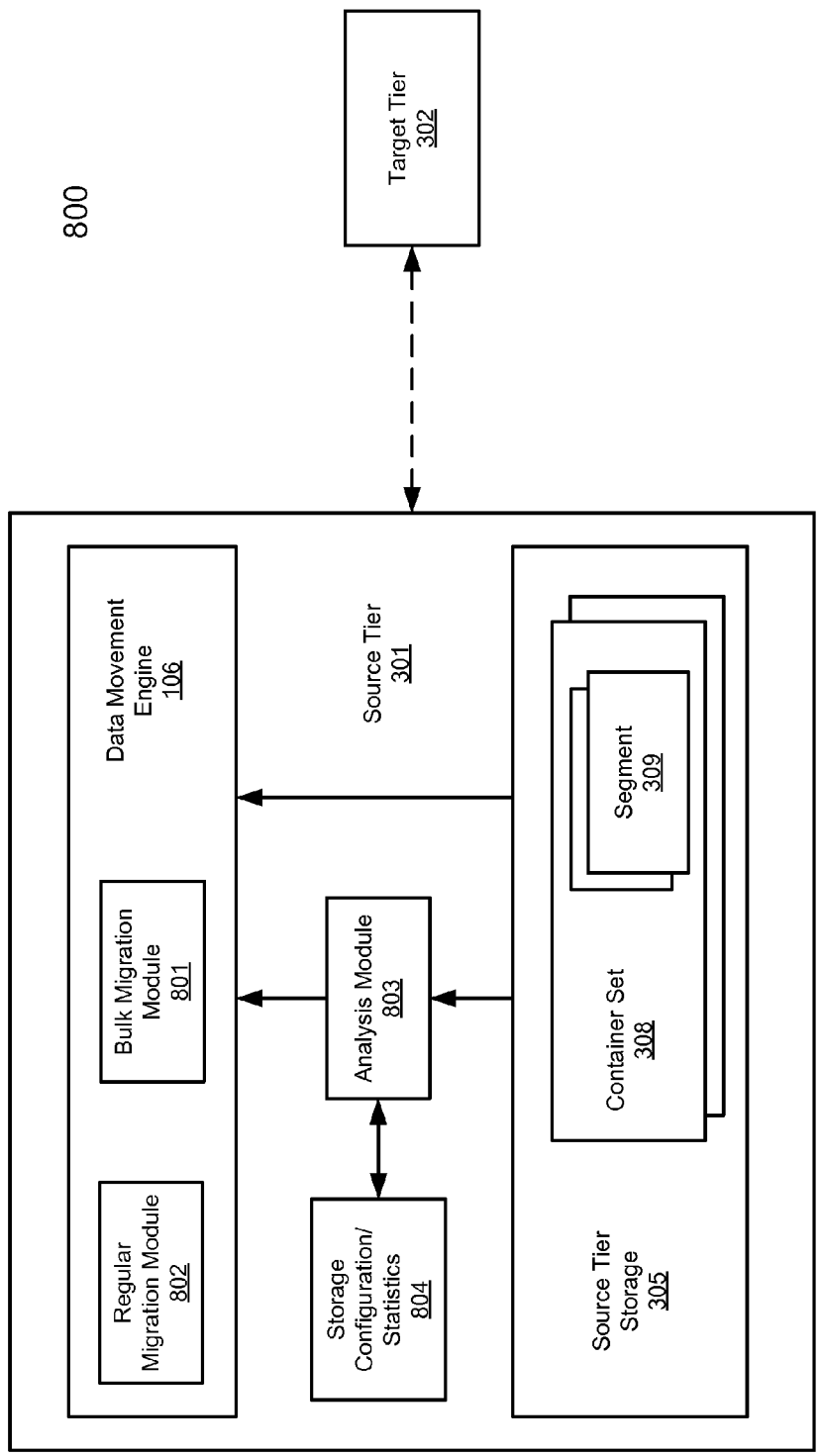
FIG. 8 is a block diagram illustrating architecture of a source tier according to one embodiment of the invention.

In one embodiment, a data movement method for data migration can be selected based on specific configuration or characteristics of the source tier at the point in time of the data migration, such as, for example, based on user requirement and data requirement. A bulk data movement method may be if there are many candidate files for migration and/or the candidate files have a lower data compression rate and/or the candidate files have poor locality so that reading the segments of the files in file order will incur many random I/Os. A regular data movement method may be selected if there are few candidate files for migration and/or the candidate files have a higher data compression rate and/or the candidate files have good locality so that the segments of the files are stored close together and largely sequentially. FIG. 8 is a block diagram illustrating architecture of a source tier according to one embodiment of the invention. System 800 may be implemented as part of system 100 of FIG. 1. Referring to FIG. 8, data movement engine 106 includes bulk migration module 801 and regular migration module 802. Bulk migration module 801 is configured to migrate data from source tier 301 to target tier 302 using a bulk data movement method as described above, while regular migration module 802 is configured to migrate the data using a regular data movement method. When a request for migration is received, one of bulk migration module 801 and regular migration module 802 is selected and invoked based on storage configuration and/or statistics 804, such as, for example, user requirements and/or data requirements of the data to be migrated. Storage configuration and/or statistics 804 may be captured or computed by analysis module 803. Analysis module 803 may periodically survey storage 305 to collect and computing storage configuration and/or statistics information 804. Analysis module 803 may be maintained by a third party vendor and invoked by source tier 301. In one embodiment, if data stored in storage 305 has a poor locality and/or a lower compression rate, bulk migration module 801 may be invoked. If data stored in storage 305 has a better locality and/or higher compression rate (in view of a predetermined threshold), regular migration module 802 may be invoked. For example, for small amount of files, a regular data-movement method is utilized. As setup cost of bulk data-movement (including scanning target container set to build a target index and scanning source container set to transfer candidate segments) is fixed, it will not be amortized across small number of files. When a target tier is close to full, a regular data-movement method may also be utilized which has better/accurate control of size estimation of target tier.

Figure 9:
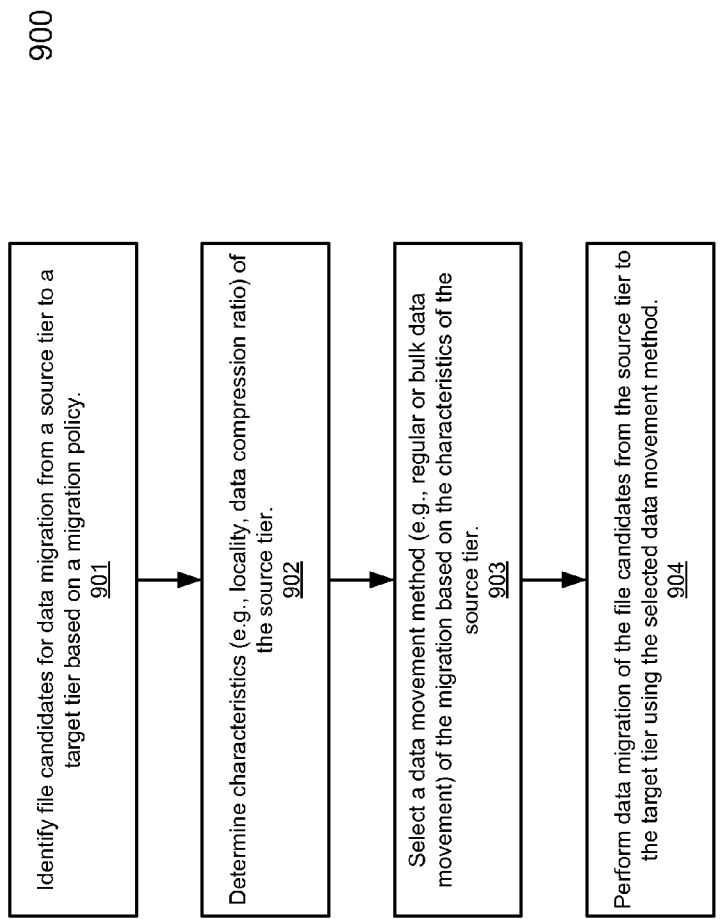
FIG. 9 is a flow diagram illustrating a method for data migration according to another embodiment of the invention.

FIG. 9 is a flow diagram illustrating a method for data migration according to another embodiment of the invention. Method 900 may be performed by system 800 of FIG. 8. Referring to FIG. 9, at block 901, candidate files for migration are identified based on one or more migration policies. At block 902, processing logic determines storage configuration and/or characteristics of the source tier, such as, for example, user requirements and/or data requirements of the data (e.g., locality, data compression rates). At block 903, a data movement method such as bulk movement or regular movement method is selected based on the storage configuration and/or characteristics. At block 904, data migration is performed using the selected data movement method.

Figure 10:
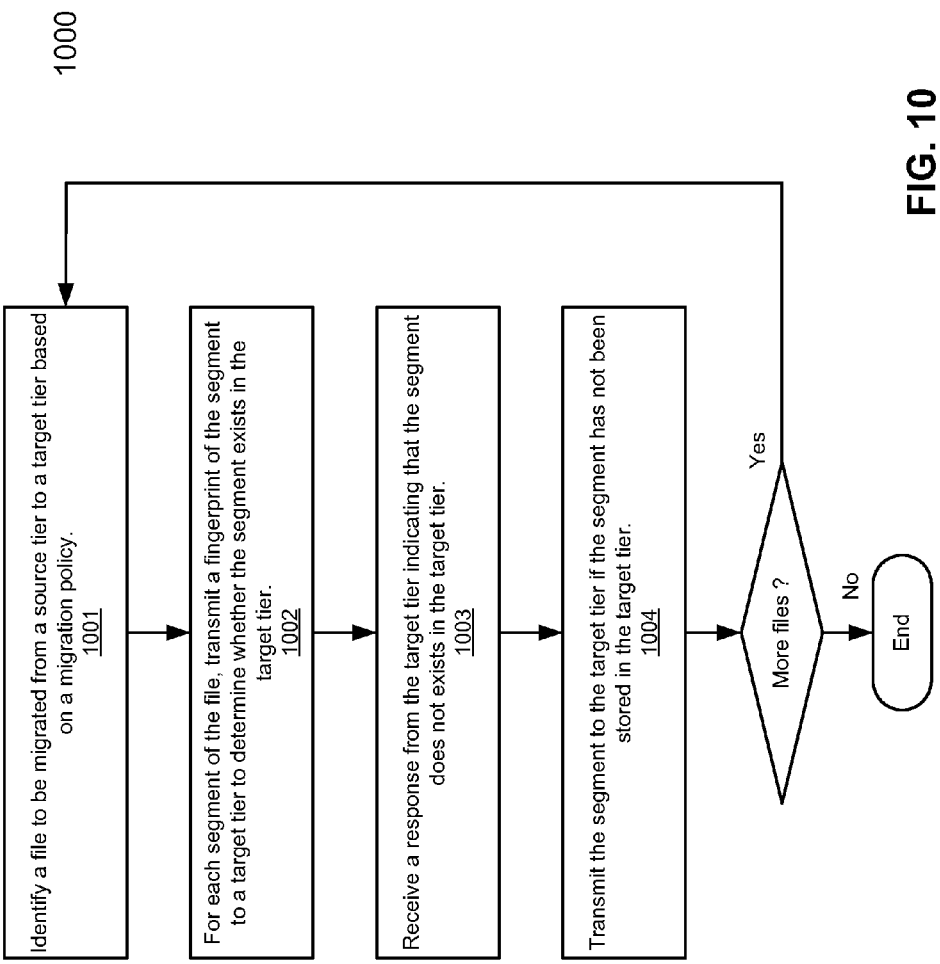
FIG. 10 is a flow diagram illustrating a method for migration using a regular data movement method according to one embodiment of the invention.

FIG. 10 is a flow diagram illustrating a method for migration using a regular data movement method according to one embodiment of the invention. Method 1000 may be performed by regular migration module 802 of FIG. 8. Referring to FIG. 10, at block 1001, a file is identified in a source tier as a candidate file for migration based on one or more migration policies. At block 1002, for each segment of the file, processing logic transmits a fingerprint of the segment to a target tier to allow the target tier to determine whether the segment has been stored in the target tier. At block 1003, a response is received from the target tier indicating that the segment has not been stored in the target tier. At block 1004, the segment is then transmitted to the target tier. The operations of blocks 1001-1004 may be iteratively performed for each of the candidate files. Further details concerning data migration with a regular data movement method can be found in co-pending U.S. patent application Ser. No. 12/983,281, filed Dec. 31, 2010, which is incorporated by reference herein in its entirety.

Figure 11:
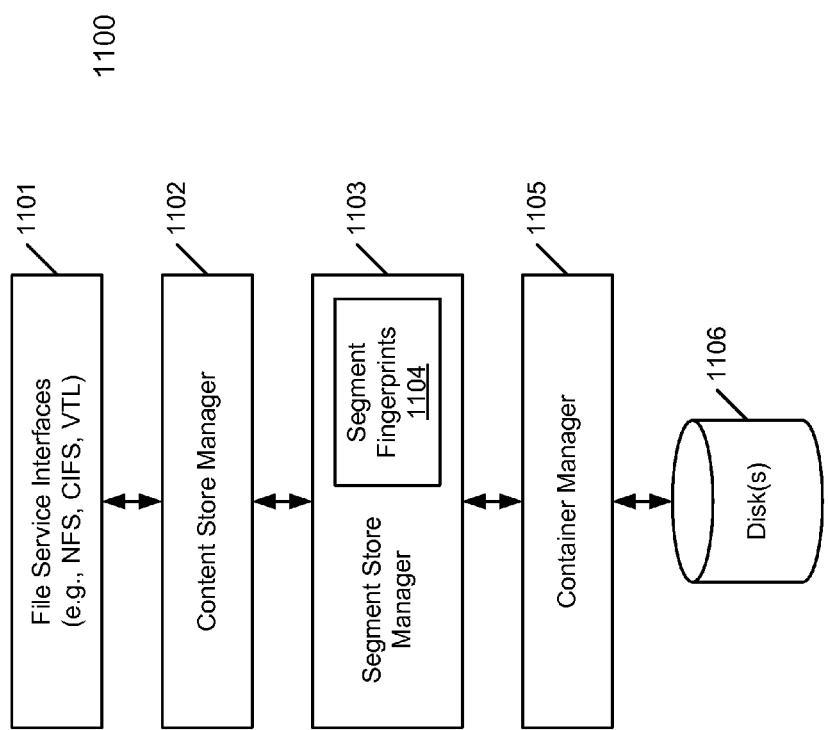
FIG. 11 is a block diagram illustrating an example of a data storage system which may be used with an embodiment of the invention.

FIG. 11 is a block diagram illustrating an example of a data storage system which may be used with an embodiment of the invention. For example, system 1100 may be implemented as part of a storage system as shown in FIG. 1. In this example, system 1100 may represent architecture of a deduplicating data storage system. Referring to FIG. 11, system 1100 includes, but it is not limited to, file service interface 1101, content store manager 1102, segment store manager 1103 having segment fingerprints 1104, and container manager 1105 for managing segments stored in containers in disk or disks 1106.

According to one embodiment, system 1100 breaks a data object (e.g., a file) into variable-length segments in a content dependent manner and computes a fingerprint for each segment. System 1100 uses the fingerprints both to identify duplicate segments and as part of a segment descriptor used to reference a segment. It represents files as sequences of segment fingerprints. During writes, system 1100 identifies duplicate segments and does its best to store only one copy of any particular segment. Before storing a new segment, system 1100 may use a variety of compression algorithm, such as a variation of the Lempel-Ziv algorithm, to compress the segment. In one embodiment, system 1100 supports multiple access protocols which are layered on a common file services interface 1101. Supported protocols include a network file system (NFS), a common Internet file system (CIFS), and a virtual tape library interface (VTL), etc. System 1100 includes an administrative interface for managing the system. The administrative interface may be a part of file services interface 1101.

When a data stream enters system 1100, it goes through one of the standard interfaces to the generic file services layer, which manages the name space and file metadata. The file services layer forwards write requests to content store manager 1102 which manages the data content within a file. Content store manager 1102 breaks a data stream into segments, uses segment store manager 1103 to perform deduplication, and keeps track of the references for a file (e.g., mapping between logical data objects and physical data objects). Segment store manager 1103 does the actual work of deduplication. It packs deduplicated (unique) segments into relatively large units, compresses such units using a variation of compression algorithms, such as a Lempel-Ziv algorithm, to further compress the data, and then writes the compressed results into containers managed by container manager 1105.

To read a data stream from system 1100, a client drives the read operation through one of the standard interfaces and the file services layer 1101. Content store manager 1102 uses references to deduplicated segments to deliver the desired data stream to the client. Segment store manager 1103 prefetches, decompresses, reads and caches data segments from container manager 1105. According to one embodiment, content store manager 1102 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store manager 1102 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments. To read a range of bytes in an object, content store manager 1102 traverses a tree of segments created by the segment mapping operation above to obtain the segment descriptors for the relevant segments. It fetches the segments from a segment store (not shown) and returns the requested byte range to the client.

Segment store manager 1103 essentially manages a database of segments keyed by their segment descriptors 1104. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variety of compression algorithms such as a variation of the Ziv-Lempel algorithm. A container, when fully packed, is appended to container manager 1105. Finally, segment indexing updates the segment index that maps segment descriptors to the container holding the segment, after the container has been appended to container manager 1105. To read a data segment, segment store manager 1103 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 1105. Container unpacking decompresses the retrieved portion of the container and returns the requested data segment.

The container manager 1105 provides a storage container log abstraction, not a block abstraction, to segment store 1103. A container includes a metadata section having the segment descriptors for the stored segments. They are immutable in that new containers can be appended and old containers deleted, but containers cannot be modified once written. When segment store manager 1103 appends a container, the container manager 1105 returns a container ID which is unique over the life of the system. The container manager 1105 is responsible for allocating, deallocating, reading, writing and reliably storing containers. It supports reads of the metadata section or a portion of the data section, but it only supports appends of whole containers. If a container is not full but needs to be written to disk, it is padded out to its full size. Container manager 1105 is built on top of standard block storage 1106. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer. According to one embodiment, certain components of system 1100, such as file service interface, include a logic configured to examine whether a particular request received could possibly compromise the integrity of an immutable data object and to request the necessary approval from an authorization agent for such a request, using the techniques set forth above. Other configurations may also exist.

Figure 12:
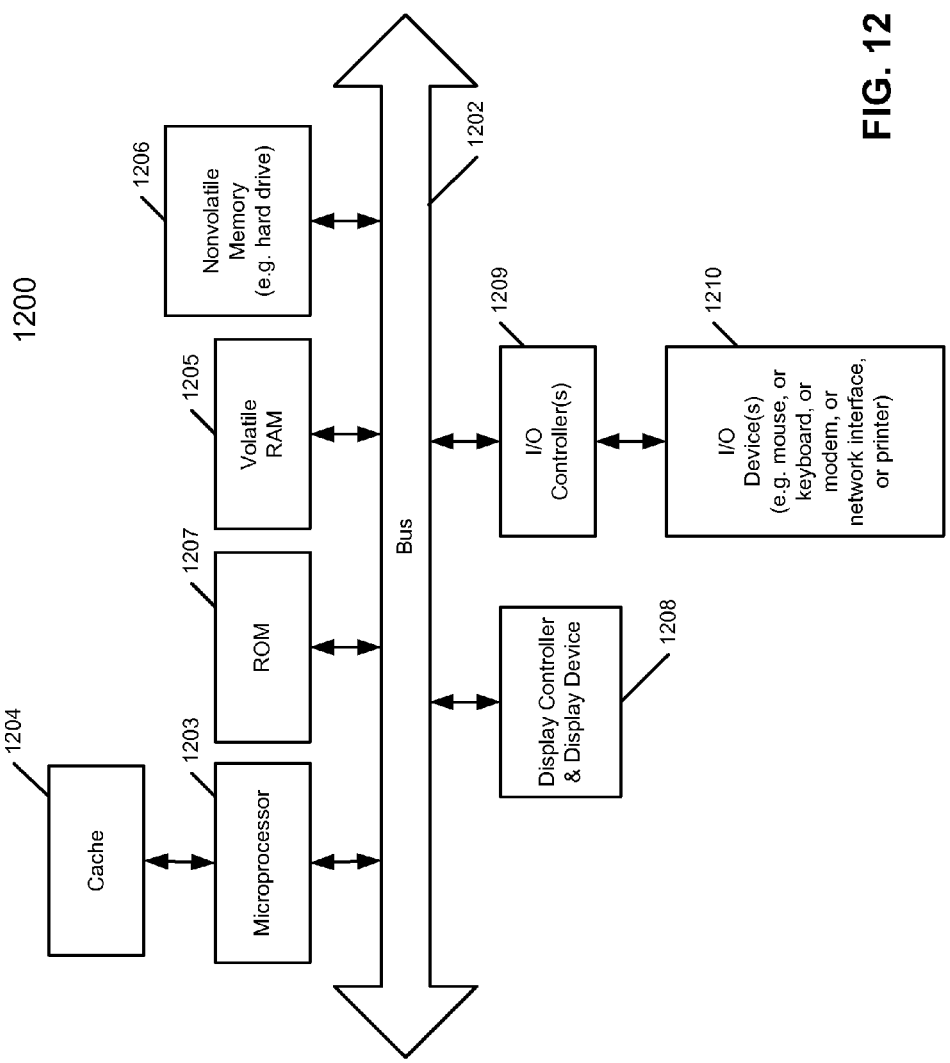
FIG. 12 is a block diagram of a data processing system which may be used with one embodiment of the invention.

FIG. 12 is a block diagram of a data processing system which may be used with one embodiment of the invention. For example, system 1200 may be used as a client or server computer as shown in FIG. 1. Note that while FIG. 12 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention.

As shown in FIG. 12, the computer system 1200, which is in a form of a data processing system, includes a bus or interconnect 1202 coupled to a processor 1203 and a ROM 1207, a volatile RAM 1205, and a non-volatile memory 1206. Processor 1203 may include multiple processors and/or core logics that constitute central processing units (CPUs) of the system and thus, control the overall operations of the system.

According to certain embodiments, processor 1203 accomplish this by executing software stored in any of the memories 1205-1207, such as, for example, applications and operating system, etc. Processor 1203 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 1203, which may be, for example, an Intel processor or a PowerPC processor, is coupled to cache memory 1204 as shown in the example of FIG. 12. The bus 1202 interconnects these various components together and also interconnects these components 1203 and 1205-1207 to a display controller and display device 1208, as well as to input/output (I/O) devices 1210, which may be mice, keyboards, modems, network interfaces, printers, and other devices which are well-known in the art.

Typically, the input/output devices 1210 are coupled to the system through input/output controllers 1209. The volatile RAM 1205 is typically implemented as dynamic RAM (DRAM) which requires power continuously in order to refresh or maintain the data in the memory. The non-volatile memory 1206 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 12 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1202 may include one or more buses connected to each other through various bridges, controllers, and/or adapters, as is well-known in the art. In one embodiment, the I/O controller 1209 includes a USB (Universal Serial Bus) adapter for controlling USB peripherals. Alternatively, I/O controller 1209 may include an IEEE-1394 adapter, also known as FireWire adapter, for controlling FireWire devices. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   in response to a request for data migration from a source storage tier to a target storage tier, identifying, by a processor, one or more candidate files to be migrated from the source storage tier to the target storage tier;
   generating, by the processor, a candidate index having information stored therein for identifying a plurality of segments associated with each of the candidate files;
   after the segments associated with the one or more candidate files have been indicated in the candidate index, retrieving by the processor the segments from one or more storage units of the source storage tier based on the information stored in the candidate index; and
   migrating, by the processor, the segments of the one or more candidate files from the source storage tier to the target storage tier, including transmitting segments of the source storage tier that are identified based on the candidate index to the target storage tier over a network, wherein the source storage tier and the target storage tier are separate storage systems coupled to the network, wherein migrating segments of the one or more candidate files comprises:
   scanning storage containers containing segments in the source storage tier,
   identifying candidate segments in the scanned storage containers based on the candidate index,
   generating a fingerprint for each candidate segment by performing a hash operation on the candidate segment,
   transmitting the fingerprint to the target storage tier to allow the target storage tier to determine based on the fingerprint whether the candidate segment has been stored in the target storage tier, and transmitting to the target storage tier the candidate segments that have not been stored in the target storage.

2. The method of claim 1, further comprising identifying the one or more candidate files based on a predetermined policy governing files stored in the source storage tier.

3. The method of claim 2, wherein a file is designated as a candidate file when the file has not been accessed for a predetermined period of time which is set forth in the predetermined policy.

4. The method of claim 2, wherein all candidate files are identified from the source storage tier and indicated in the candidate index before starting migration of segments of the candidate files in a bulk manner.

5. The method of claim 1, wherein generating a candidate index comprises:
   for each candidate file, identifying a plurality of segments associated with the candidate file;
   for each of the segments of each candidate file, generating a fingerprint of the segment by performing a hash operation on the segment using a predetermined hash function; and
   populating a field of the candidate index based on the fingerprint, wherein a value of the field indicates that the segment is to be migrated.

6. The method of claim 5, wherein the candidate index comprises a bloom filter.

7. The method of claim 5, wherein the candidate index is a bit array, and wherein the fingerprint determines an offset to an entry of the bit array that stores a value indicating migration of the segment.

8. A non-transitory computer-readable storage medium having instructions stored therein, which when executed by a computer, cause the computer to perform operations of data migration of a storage system, the operations comprising:
   in response to a request for data migration from a source storage tier to a target storage tier, identifying, by a processor, one or more candidate files to be migrated from the source storage tier to the target storage tier;
   generating a candidate index having information stored therein for identifying a plurality of segments associated with each of the candidate files;
   after the segments associated with the one or more candidate files have been indicated in the candidate index, retrieving by the processor the segments from one or more storage units of the source storage tier based on the information stored in the candidate index; and
   migrating the segments of the one or more candidate files from the source storage tier to the target storage tier, including transmitting segments of the source storage tier that are identified based on the candidate index to the target storage tier over a network, wherein the source storage tier and the target storage tier are separate storage systems coupled to the network, wherein migrating segments of the one or more candidate files comprises:
     scanning storage containers containing segments in the source storage tier,
     identifying candidate segments in the scanned storage containers based on the candidate index,
     generating a fingerprint for each candidate segment by performing a hash operation on the candidate segment,
     transmitting the fingerprint to the target storage tier to allow the target storage tier to determine based on the fingerprint whether the candidate segment has been stored in the target storage tier, and
     transmitting to the target storage tier the candidate segments that have not been stored in the target storage.

9. The non-transitory computer-readable storage medium of claim 8, wherein the method further comprises identifying the one or more candidate files based on a predetermined policy governing files stored in the source storage tier.

10. The non-transitory computer-readable storage medium of claim 9, wherein a file is designated as a candidate file when the file has not been accessed for a predetermined period of time which is set forth in the predetermined policy.

11. The non-transitory computer-readable storage medium of claim 9, wherein all candidate files are identified from the source storage tier and indicated in the candidate index before starting migration of segments of the candidate files in a bulk manner.

12. The non-transitory computer-readable storage medium of claim 8, wherein generating a candidate index comprises:
   for each candidate file, identifying a plurality of segments associated with the candidate file;
   for each of the segments of each candidate file, generating a fingerprint of the segment by performing a hash operation on the segment using a predetermined hash function; and
   populating a field of the candidate index based on the fingerprint, wherein a value of the field indicates that the segment is to be migrated.

13. The non-transitory computer-readable storage medium of claim 12, wherein the candidate index comprises a bloom filter.

14. The non-transitory computer-readable storage medium of claim 12, wherein the candidate index is a bit array, and wherein the fingerprint determines an offset to an entry of the bit array that stores a value indicating migration of the segment.

15. A storage system operating as a source storage tier, the system comprising:
   a candidate builder executed by a processor, in response to a request for data migration from the source storage tier to a target storage tier, to identify one or more candidate files to be migrated from the source storage tier to the target storage tier and to generate a candidate index having information stored therein for identifying a plurality of segments associated with each of the candidate files; and
   a migration module executed by the processor and coupled to the candidate builder, after the segments associated with the one or more candidate files have been indicated in the candidate index, to retrieve the segments from one or more storage units of the source storage tier based on the information stored in the candidate index and to migrate the segments of the one or more candidate files from the source storage tier to the target storage tier, including transmitting segments of the source storage tier that are identified based on the candidate index to the target storage tier over a network, wherein the source storage tier and the target storage tier are separate storage systems coupled to the network, wherein migrating segments of the one or more candidate files comprises:
     scanning storage containers containing segments in the source storage tier,
     identifying candidate segments in the scanned storage containers based on the candidate index,
     generating a fingerprint for each candidate segment by performing a hash operation on the candidate segment,
     transmitting the fingerprint to the target storage tier to allow the target storage tier to determine based on the fingerprint whether the candidate segment has been stored in the target storage tier, and transmitting to the target storage tier the candidate segments that have not been stored in the target storage.

16. The system of claim 15, wherein the candidate builder is configured to identify the one or more candidate files based on a predetermined policy governing files stored in the source storage tier.

17. The system of claim 16, wherein a file is designated as a candidate file when the file has not been accessed for a predetermined period of time which is set forth in the predetermined policy.

18. The system of claim 16, wherein all candidate files are identified from the source storage tier and indicated in the candidate index before starting migration of segments of the candidate files in a bulk manner.

19. The system of claim 15, wherein generating a candidate index comprises:

for each candidate file, identifying a plurality of segments associated with the candidate file;

for each of the segments of each candidate file, generating a fingerprint of the segment by performing a hash operation on the segment using a predetermined hash function; and populating a field of the candidate index based on the fingerprint, wherein a value of the field indicates that the segment is to be migrated.

20. The system of claim 19, wherein the candidate index comprises a bloom filter.

21. The system of claim 19, wherein the candidate index is a bit array, and wherein the fingerprint determines an offset to an entry of the bit array that stores a value indicating migration of the segment.

* * * * *